United States Patent
Baumgartner

(10) Patent No.: US 7,424,358 B2
(45) Date of Patent: Sep. 9, 2008

(54) METHOD FOR ADJUSTING THE PLAY OF A DISC BRAKE

(75) Inventor: Johann Baumgartner, Moosburg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/723,942

(22) Filed: Mar. 22, 2007

(65) Prior Publication Data

US 2007/0246310 A1 Oct. 25, 2007

Related U.S. Application Data

(63) Continuation of application No. PCT/EP2005/010115, filed on Sep. 20, 2005.

(30) Foreign Application Priority Data

Sep. 22, 2004 (DE) ........................ 10 2004 045 951

(51) Int. Cl.
G06F 19/00 (2006.01)
F16D 55/02 (2006.01)

(52) U.S. Cl. ............... 701/70; 303/122.03; 188/2 R; 188/18 A; 188/71.7

(58) Field of Classification Search ............... 701/70; 188/2 R, 18 A, 18 R; 342/71
See application file for complete search history.

(56) References Cited

U.S. PATENT DOCUMENTS

| 5,353,896 | A | * | 10/1994 | Baumgartner et al. ...... 188/71.9 |
| 5,379,867 | A | * | 1/1995 | Macke et al. ............... 188/71.9 |
| 5,568,845 | A | * | 10/1996 | Baumgartner et al. ...... 188/71.9 |
| 5,848,673 | A | * | 12/1998 | Strauss et al. ........... 188/1.11 L |
| 6,213,255 | B1 | * | 4/2001 | Neuwirth .................... 188/71.9 |
| 6,237,729 | B1 | | 5/2001 | Blattert |
| 6,238,011 | B1 | | 5/2001 | Heckmann |
| 6,250,434 | B1 | | 6/2001 | Baumgartner et al. |
| 6,336,686 | B2 | * | 1/2002 | Thomas et al. .................. 303/2 |
| 6,668,981 | B2 | * | 12/2003 | Ortegren et al. ............ 188/72.2 |
| 6,955,246 | B2 | * | 10/2005 | Norman et al. ............ 188/71.8 |
| 7,182,184 | B2 | * | 2/2007 | Baumgartner ............... 188/156 |
| 7,331,431 | B2 | * | 2/2008 | Fischer et al. .............. 188/71.9 |

(Continued)

FOREIGN PATENT DOCUMENTS

EP    0 995 923 A2    4/2000

(Continued)

OTHER PUBLICATIONS

International Search Report dated Dec. 20, 2005.

(Continued)

Primary Examiner—Yonel Beaulieu
(74) Attorney, Agent, or Firm—Crowell & Moring LLP

(57) ABSTRACT

A method is provided for adjusting the play between the brake linings and the brake disc of a pneumatically actuated disc brake by way of at least one or several adjustment devices actuated by electric motors. The method sensorlessly determines the play caused by braking with the aid of a computer by use of a computer prognosis, wherein the prognosis includes wear caused by braking and the brake component variations in time produced by energy released by the braking, and the thus determined variations are adjusted at predetermined time intervals on at least one adjustment device by a corresponding adjustment process.

9 Claims, 2 Drawing Sheets

U.S. PATENT DOCUMENTS

2006/0266598 A1    11/2006    Baumgartner et al.

FOREIGN PATENT DOCUMENTS

| WO | WO 03/042019 A1 | 5/2003 |
|---|---|---|
| WO | WO 2005/059396 A1 | 6/2005 |

OTHER PUBLICATIONS

Corresponding Written Opinion of the International Searching Authority (Form PCT/ISA/237) with English translation including Forms PCT/IB/338 and PCT/IB/373 (Thirteen (13) pages) Attached.

* cited by examiner

METHOD FOR ADJUSTING THE PLAY OF A DISC BRAKE

CROSS-REFERENCE TO RELATED APPLICATIONS

This application is a continuation of PCT International Application No. PCT/EP2005/010115, filed on Sep. 20, 2005, which claims priority under 35 U.S.C. §119 to German Application No. 10 2004 045 951.7, filed Sep. 22, 2004, the entire disclosures of which are expressly incorporated by reference herein.

BACKGROUND AND SUMMARY OF THE INVENTION

The invention relates to a method for adjusting the play between brake linings and a brake disc of a preferably pneumatically actuated disc brake by the use of at least one or more electromotively driven adjusting devices.

Fields of application of the invention are, on the one hand, the adjustment of electrically driven adjusting devices of pneumatically or hydraulically driven disc brakes, and on the other hand, the adjustment of disc brakes in which not only the adjustment, but also the application, takes place electromotively.

The invention is very particularly preferable for use in disc brakes having a pneumatically actuated brake application device or with a pneumatic force generating device, which acts on the brake application device, with the adjustment of the disc brake taking place electromotively. It is possible, here, to arrange one or more electromotively operated adjusting devices at one, or preferably both, sides of the brake disc.

It is known from the prior art, in the adjustment of electromotively driven wear adjusting systems, to firstly measure the "play" or "air play" in each case in an ongoing fashion, for example by use of a sensor, and to subsequently carry out a correction or adjustment. In this respect, reference is, for example, made to prior art reference EP 0 995 923 A2.

A disadvantage of this known prior art is the expenditure for the measurement of the parameters and the susceptibility to failure of the force sensors and travel or rotational angle sensors which act in the braking mechanism.

It is also disadvantageous that an air play measuring process can only take place in conjunction with a brake actuation.

It is, therefore, intended to provide a method, which avoids these disadvantages, for adjusting an air play of a disc brake by use of electromotively driven adjusting devices.

Here, the adjustment of the air play should take place without additional sensors, and it should nevertheless be possible to set the smallest possible air play, wherein the disadvantage of constantly repeatedly placing the brake linings in grinding contact with the brake disc also need not be accepted or need only be accepted to a small extent.

The invention meets these needs by providing a method for adjusting the air play between brake linings and a brake disc of a preferably pneumatically actuated disc brake by use of at least one or more electromotively driven adjusting devices. By use of a processor, changes in the air play as a result of braking operations are determined without sensors via a mathematical prognosis, wherein the wear occurring during the braking operation, and the time-based change of the components of the brake as a result of the energy released during braking operations, is incorporated in the prognosis. The changes determined in this way are corrected at predefined time intervals by way of corresponding adjusting processes by the at least one or more adjusting devices.

The invention thereby provides a method for adjusting the air play between brake linings on both sides of a brake disc of a disc brake by use of at least one electromotively driven adjusting device, in which method, by use of a processor—for example on the brake—changes in the air play as a result of braking operations are determined using a mathematical prognosis or simulation, wherein the change of the components of the brake as a result of the energy released during braking operations is incorporated in the prognosis, and the changes determined in this way are corrected at predefined "small" time intervals of, for example, a few seconds (for example 2 to 60 seconds) by way of corresponding adjusting processes.

It is the case in particular that, after a braking operation, the initially occurring expansion of the brake components, and then the contraction behavior of said components as a result of the subsequent cooling, is incorporated in the prognosis, and in that the one-off prognosis after a braking operation is used to carry out a plurality of successive adjusting processes after the braking operation.

It is expedient if at least the brake linings and the brake disc are incorporated in the calculation of the brake components, which expand and subsequently contract during the braking operation.

It is advantageously additionally the case that, at time intervals which are to be selected by way of the prognosis to be larger than the time interval of the adjusting processes, for example in each case after a few minutes or for example half an hour, a resetting of the air play is carried out by placing the brake linings in grinding contact against the brake disc with the adjusting devices and by a subsequent resetting to the nominal air play. In this way, during a relatively long journey, the air play is continuously set to the correct value by placing the brake linings against the disc, and possible deviations of the simulation from the actual conditions are corrected. This method step is carried out between braking operations with a sufficiently long time interval if sufficient time is available for carrying out the adjustment. If the adjustment is, for example, interrupted by a new braking operation, then the air play adjustment on the basis of the simulation is resorted to again in the first instance.

Other objects, advantages and novel features of the present invention will become apparent from the following detailed description of the invention when considered in conjunction with the accompanying drawings.

DETAILED DESCRIPTION OF THE DRAWINGS

Figure 2:
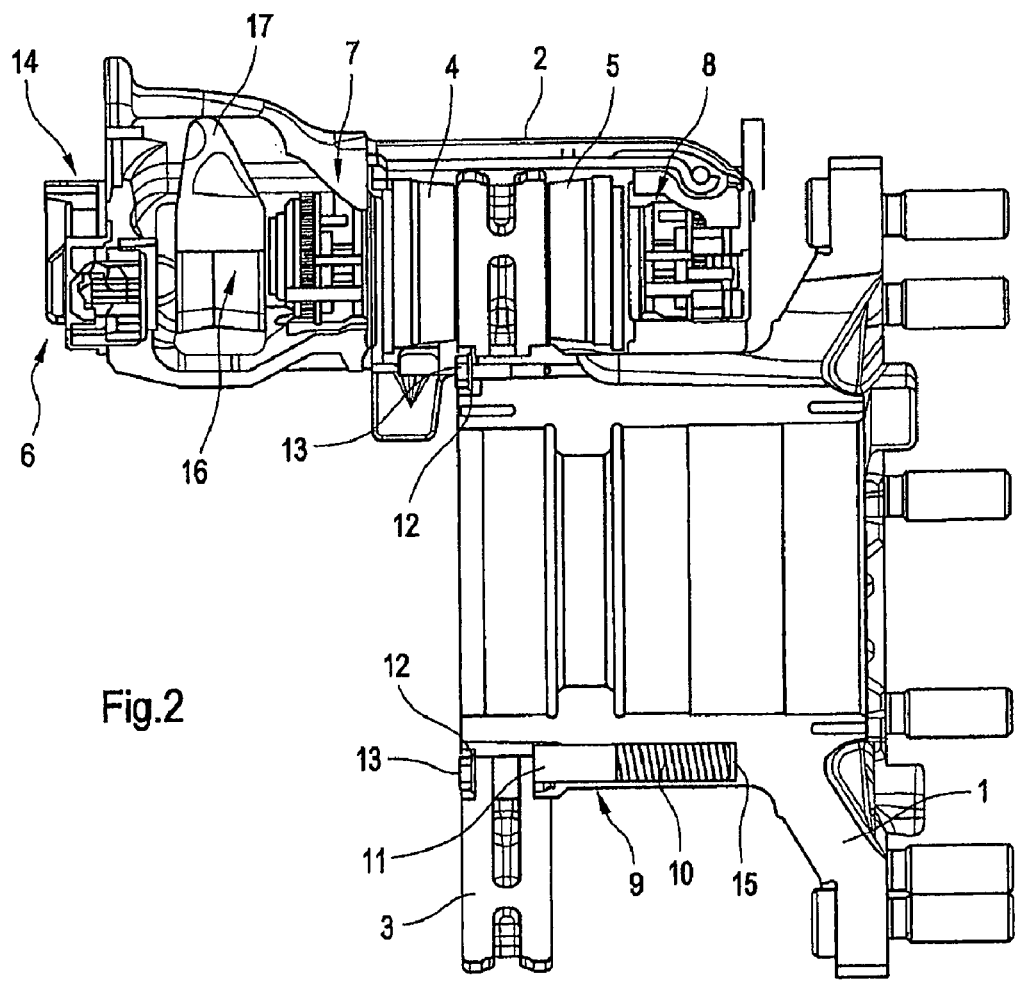
FIG. 2 shows a disc brake in a sectioned, schematic side view.

FIG. 2 illustrates a disc brake, which is embodied here by way of example as a fixed-caliper brake, for commercial vehicles. The disc brake has a brake caliper 2, which is embodied as a fixed caliper and engages over a brake disc 3, which brake disc is arranged in an axially displaceable and rotationally secured manner on a vehicle part embodied as an axle flange 1. The fixed caliper 2 is fixed to the axle flange 1 in a non-movable manner.

A brake application device 16, which can be actuated by a piston rod of a brake cylinder, is arranged in the fixed caliper 2. The brake application device 16 has a rotary lever 17 mounted eccentrically in the brake caliper and being designed and constructed such that when the rotary lever 17 pivots, pressure pieces (not shown here in detail) are pushed onto the side of the brake disc 3 (referred to as the application side) parallel to the brake disc axis. The pressure pieces press a brake lining 4, which is arranged on the application side, against the brake disc 3 which, during a continuing application movement, is displaced axially in the direction of the other brake lining on the other side of the brake disc (reaction side) until it comes into contact there and the actual braking action between the brake disc 3 and the brake linings 4, 5 takes effect. The brake disc 3 and, with it, the wheel hub (or axle flange) 1 and an attached wheel (not illustrated) are braked as a result of the frictional contact of the two brake linings 4, 5. With regard to the function of an exemplary application device, reference is additionally made to WO 02/14708. A processor in a cover 14 on the disc brake serves to control electric motors 6, which carry out the method, described in the following, for adjusting the air play.

Both brake pads or linings 4, 5 are, in each case, assigned at least one, and in particular in each case two, adjusting devices 7, 8 on the application side and on the reaction side. By using the adjusting devices 7, 8 operation-related wear of the brake linings 4, 5 can be compensated, that is to say, by way of example, after each or after a plurality of braking operation(s), the brake linings 4, 5 are adjusted, by the distance of the wear thickness, in the direction of the brake disc 3. The adjusting devices are electromechanically driven, in each case one electric motor 6 being provided here on each side of the brake disc (only electric motor 6 on the application side can be seen here). The electric motor 6 acts via a drive connection on rotary spindles or the like which, when rotated, change the axial position of the pressure pieces relative to the brake disc 3. The advantage of the adjusting operations lies, inter alia, in the possibility of utilizing "intelligent" air play functions, which extend far beyond merely adjusting the brake.

In order to ensure that the brake disc 3 is pushed back into its initial position after the end of the braking operation, so that sufficient free play is produced between the outer brake lining 5 and the brake disc 3, according to the invention, pressure or spring elements 9 are provided, which are resilient in the displacement direction of the brake disc 3, with the brake disc 3 bearing against the pressure elements 9.

According to a variant which is not shown here, a plurality of pressure elements 9 are provided which are distributed uniformly in the circumferential direction and preferably bear against the region of the axially inner edge of the brake disc 3.

The displacement of the brake disc 3 caused by the pressure elements 9 is delimited by stops 12.

The fixed stops 12 are held by screws 13, which are screwed into the axle flange 1 at their end side.

In FIG. 2, the pressure element 9 is, by way of example, formed in two parts in a compact arrangement. The pressure element 9 includes a contact piece 11, which bears against the brake disc 3, and a pressure spring 10, which is formed as a coil spring, for generating the elastic preload between the stop 12 and the brake disc 3.

The two-part design actively prevents frictional heat, which is produced during braking, from being transmitted from the heated brake disc 3 to the pressure spring 10.

The pressure elements 9 are, in each case, inserted into an axially extending recess 15 of the axle flange 1.

Here, the stop 12 is situated on the application side, so that after a braking operation, the brake disc is reset from the reaction side in the direction of the application side.

After starting of the vehicle, or a longer vehicle journey, a nominal air play is set, for example by a sequential sensing of the brake lining positions of both brake disc sides (abutment of the adjusting devices 7, 8 against the brake disc and detection of the stop position, for example from a change in the current and/or voltage characteristic of the supply voltages or currents for the electric motors 6 and a subsequent re-positioning of the brake pads or brake linings 4, 5 relative to the brake disc. The nominal air play is then adjusted on the basis of a mathematical prognosis.

Figure 1:
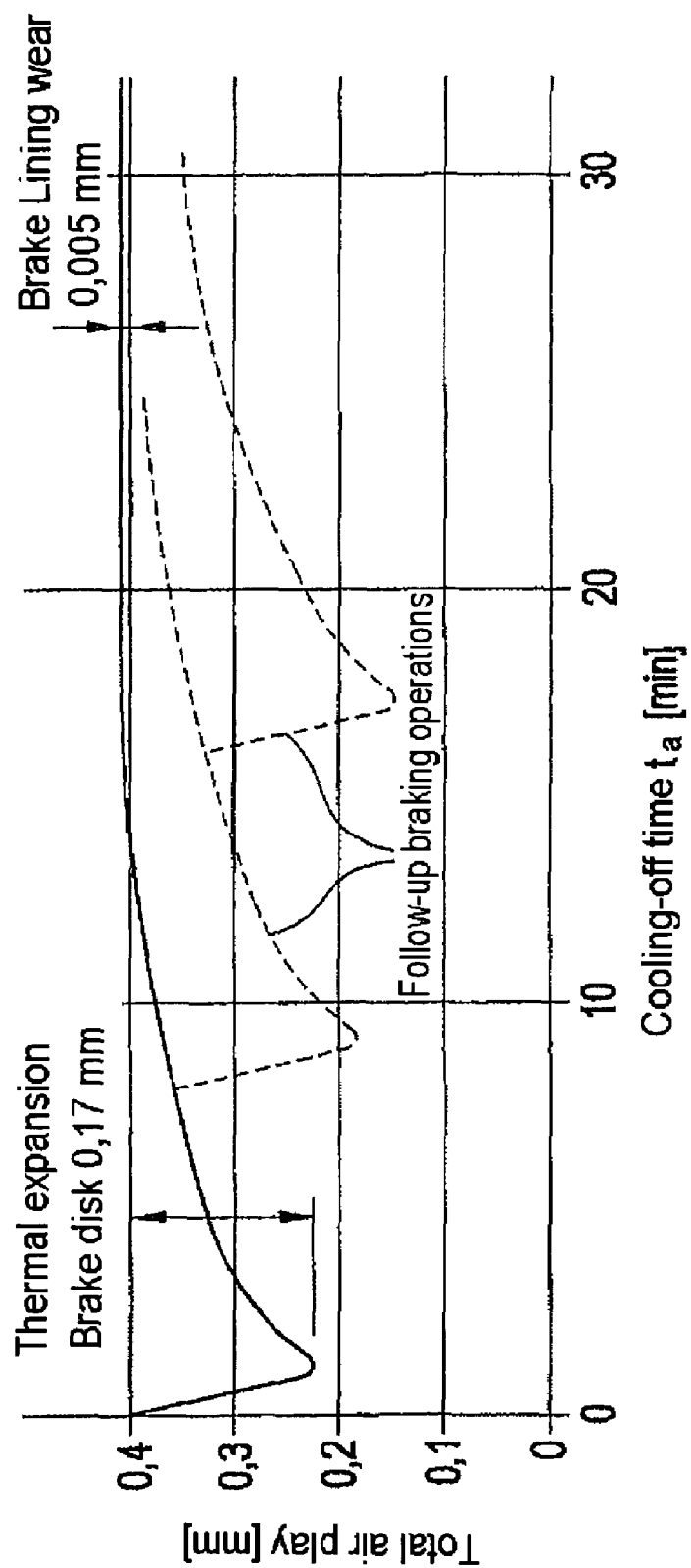
FIG. 1 is a diagram illustrating the thermal expansion and contraction processes of a disc brake of a utility vehicle.

FIG. 1 is a diagram which depicts the change in the overall air play of a utility vehicle disc brake in the course of a braking operation in the so-called "heat crack" test. The data of the braking operation are:

Vehicle speed 85 km/h,
Braking duration 40 sec,
Braking torque 2.5 kNm,
Brake disc diameter of 442 mm,
Brake disc thickness 45 mm,
Brake disc mass 25 kg, and
Brake lining thickness 21 mm.

As a result of the braking operation, the thickness of the brake disc increases, as a result of the latter being heated, by 0.17 mm, which leads to a corresponding reduction in size of the air play.

Only after a cooling duration of more than 10 minutes is the initial temperature reached again, and only then does the brake lining wear, in this example of 0.005 mm, have the effect of enlarging the air play.

The thermal expansion of the brake lining, which likewise has the effect of reducing the air play, and is determined by yet more complex relationships, is not considered in any more detail here.

In follow-up braking operations at intervals of, for example, less than 10 minutes, the cooling duration is not sufficient to reach the initial state again. This leads to a further increase of the brake disc temperature and to a further reduction of the air play.

In order to reliably control such states, it is necessary either to select a sufficiently large initial air play or to use a control regime for the adjusting system which is capable of constantly adapting the air play to the changing conditions.

Here, the enlarged air play results in large actuating paths of the brake and to a delayed response behavior.

Precisely these disadvantages of mechanical adjusting devices are eliminated by a control regime of the electromotive adjusting devices 7, 8 according to the invention.

In this way, after adjustment of the air play by placing the brake linings 4, 5 against the brake disc 3 and by a subsequent resetting to the nominal air play, for example after every start of the vehicle or after a longer vehicle journey, changes in the air play caused, for example by wear, thermal expansion and contraction processes of the friction bodies, are determined by a mathematical prognosis by evaluating the intermediate braking activities, taking into consideration the structural and material data of the brake components, and the driving states. The changes which have correspondingly taken place are corrected at short time intervals by corresponding adjusting operations of the electric motors 6 and the adjusting devices 7, 8 which are assigned to the electric motors.

The behavior of the disc brake can, for example, be measured once, with the measured values then serving as the basis for the prognosis method.

In incorporating the wear which occurs during the braking operation and the changes, with time and in particular in geometrical terms, of components of the brake as a result of the energy released during braking, it is recommended to use the following parameters.

Changes in the air play generally result from wear of the brake linings and the brake disc and from thermal expansion or contraction of the brake linings, the brake disc or brake components.

Here, air play enlargements generally take place as a result of the wear of the brake linings and the brake disc, as a result of the contraction of the brake linings and the brake disc through cooling, as a result of contraction of the spreading device (lever, pressure plunger, EDC) through cooling and/or as a result of expansion of the caliper frame through thermal expansion.

In contrast, air play reductions take place as a result of thermal expansion of the brake linings and the brake disc, as a result of thermal expansion of the spreading device, and/or contraction of the caliper frame through cooling.

All of these parameters can be incorporated in the prognosis either individually or in combination.

Here, the processes which cause the air play to be enlarged and reduced generally take place in parallel in terms of time with very different temperature and time dependencies.

The wear of the friction bodies (brake linings and brake disc) is determined substantially by the braking work, that is to say by the braking energy, which can be determined relatively precisely.

A further influence is given by the temperature of the friction bodies. The influence is considerably more pronounced for the brake lining wear than for the brake disc, and has the opposite effect. The resulting wear of the brake linings in a heat crack test at 650° C. is, for example, typically more than twice as high as in a wear test at 250° C. The temperature of the brake disc and the brake linings is in turn a cause of the friction work which is converted to heat at the brake, and is dependent on the cooling conditions.

The friction work of the brake can be easily determined if the braking operation is divided into a plurality of small wheel rotational angle sections, with the size of the wheel rotational angle being selected such that, for a sufficiently precise consideration, the brake cylinder pressure can be considered to be constant within the section.

In contrast, in order to determine the brake lining and brake disc wear (as a summed value), it is expedient to use experimentally determined average values as a basis. A typical value is for example 0.132 mm specific summed wear of the brake linings and the brake disc per 100 MJ of converted friction energy.

Depending on the design of the respective brake system, it is perferably possible in this way to determine, from a mixture of experimentally determined data and mathematically calculated values, a suitable parameter set which can be incorporated in the prognosis.

It is for example additionally possible for the cooling power of the brake disc to be determined on a centrifugal mass test stand or in vehicle tests from cooling curves.

The temperature profile is evaluated, for example after the end of heating processes, as a result of the braking operations.

TABLE OF REFERENCE SYMBOLS

1 Axle flange
2 Brake caliper
3 Brake disc
4 Brake pad
5 Brake pad
6 Electric motor
7 Adjusting device
8 Adjusting device
9 Pressure element
10 Pressure spring
11 Contact piece
12 Stop
13 Screw
14 Cover
15 Recess
16 Brake application device
17 Rotary lever The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting air play between brake linings and a brake disc of a disc brake using one or more electromotively driven wear adjusting devices, the method comprising the acts of:

determining changes in air play due to braking operations via a mathematical model using a processor, the mathematical model incorporating at least wear occurring during the braking operations and a time-based change of the disc brake components due to energy released during braking operations; and correcting, at predefined intervals via corresponding adjusting processes using the one or more wear adjusting devices, the changes in the air play determined using the mathematical model in the processor.

2. The method according to claim 1, wherein the time-based change of the disc brake components includes, after a braking operation, an initially occurring expansion of the components and the subsequent contraction behavior upon cooling of the components, and wherein a one-off prognosis is determined after the braking operation, and used to perform a plurality of successive adjusting processes after the braking operation.

3. The method according to claim 1, further comprising the acts of:

at time intervals selected via the mathematical model to be larger than a time interval of the adjusting processes, placing the brake linings in grinding contact against the brake disc using the adjusting devices; and resetting the air play to a nominal air play based on the placing act.

4. The method according to claim 2, further comprising the acts of:

at time intervals selected via the mathematical model to be larger than a time interval of the adjusting processes, placing the brake linings in grinding contact against the brake disc using the adjusting devices; and resetting the air play to a nominal air play based on the placing act.

5. The method according to claim 2, wherein the mathematical model incorporates the expansion and subsequent contraction during braking operations of at least the brake linings and the brake disc.

6. The method according to claim 4, wherein the mathematical model incorporates the expansion and subsequent contraction during braking operations of at least the brake linings and the brake disc.

7. A method for adjusting play between brake linings and a brake disc of a pneumatically actuated disc brake for a commercial vehicle, wherein the play is adjusted via at least one or more adjustment devices actuated by electric motors, the method comprising the acts of:

determining in a sensorless manner the play caused by braking via a computer prognosis calculated by a computer, said prognosis including wear caused by braking and brake component variations in time produced by energy released by braking;

adjusting the determined play variations at predetermined time intervals using at least one of the one or more adjustment devices via a corresponding adjustment process.

8. The method according to claim 7, wherein the computer prognosis incorporates at least the expansion and subsequent cooling contraction of the brake linings and the brake disc.

9. The method according to claim 8, wherein the computer prognosis further incorporates the expansion and subsequent cooling contraction of a brake caliper of the disc brake.

* * * * *